United States Patent
Mayer et al.

(10) Patent No.: US 9,008,579 B2
(45) Date of Patent: Apr. 14, 2015

(54) SYSTEM AND METHOD FOR TRANSMITTING DATA BETWEEN COMMUNICATION TERMINALS

(75) Inventors: Pavel Mayer, Berlin (DE); Dirk Lusebrink, Berlin (DE); Rodja Trappe, Berlin (DE); David Siegel, Berlin (DE)

(73) Assignee: Art + Com AG, Berlin (DE)

( * ) Notice: Subject to any disclaimer, the term of this patent is extended or adjusted under 35 U.S.C. 154(b) by 603 days.

(21) Appl. No.: 13/383,659

(22) PCT Filed: Jul. 16, 2010

(86) PCT No.: PCT/EP2010/060370
§ 371 (c)(1),
(2), (4) Date: Jul. 23, 2012

(87) PCT Pub. No.: WO2011/007010
PCT Pub. Date: Jan. 20, 2011

(65) Prior Publication Data
US 2012/0282859 A1 Nov. 8, 2012

(30) Foreign Application Priority Data
Jul. 17, 2009 (DE) .......................... 10 2009 027 816

(51) Int. Cl.
*H04B 7/00* (2006.01)
*H04W 4/02* (2009.01)
*H04W 4/20* (2009.01)
*H04L 29/08* (2006.01)

(52) U.S. Cl.
CPC ................. *H04W 4/02* (2013.01); *H04W 4/023* (2013.01); *H04W 4/20* (2013.01); *H04L 67/18* (2013.01); *H04L 67/28* (2013.01)

(58) Field of Classification Search
USPC ....................................................... 455/41.2
See application file for complete search history.

(56) References Cited

U.S. PATENT DOCUMENTS

| 5,784,367 | A | * | 7/1998 | Sannino | 370/360 |
| 2002/0140625 | A1 | * | 10/2002 | Kidney et al. | 345/1.1 |
| 2002/0165919 | A1 | | 11/2002 | Pietila | |
| 2006/0256074 | A1 | | 11/2006 | Krum et al. | |
| 2008/0205354 | A1 | * | 8/2008 | Makela et al. | 370/338 |

FOREIGN PATENT DOCUMENTS

| GB | 2390510 A | * | 1/2004 | ............... H04Q 7/38 |
| GB | 2390510 A1 | | 1/2004 | |
| WO | 0249374 A2 | | 6/2002 | |
| WO | WO 0249374 A2 | * | 6/2002 | ............... H04Q 7/00 |
| WO | 2008014014 A1 | | 1/2008 | |

OTHER PUBLICATIONS

Hossain et al., A Comprehensive Study of Bluetooth Signal Parameters for Localization, 18th Annual IEEE International Symposium on Personal, Indoor and Mobile Radio Communications, Sep. 1, 2007, 5 pages.

* cited by examiner

*Primary Examiner* — Ajibola Akinyemi
(74) *Attorney, Agent, or Firm* — The Webb Law Firm

(57) ABSTRACT

A system and method for transmitting data between at least two communication terminals includes handling useful address data by a switching unit and handling useful data records by a data exchange node. A spatial distance of the at least two communication terminals is calculated. A time interval of communication inquiries to the switching unit in order to initiate a data transmission between the at least two communication terminals is determined. The data transmission is controlled depending on predeterminable threshold values of the spatial distance of the at least two communication terminals and the at least one time interval between the communication inquiries.

20 Claims, 7 Drawing Sheets

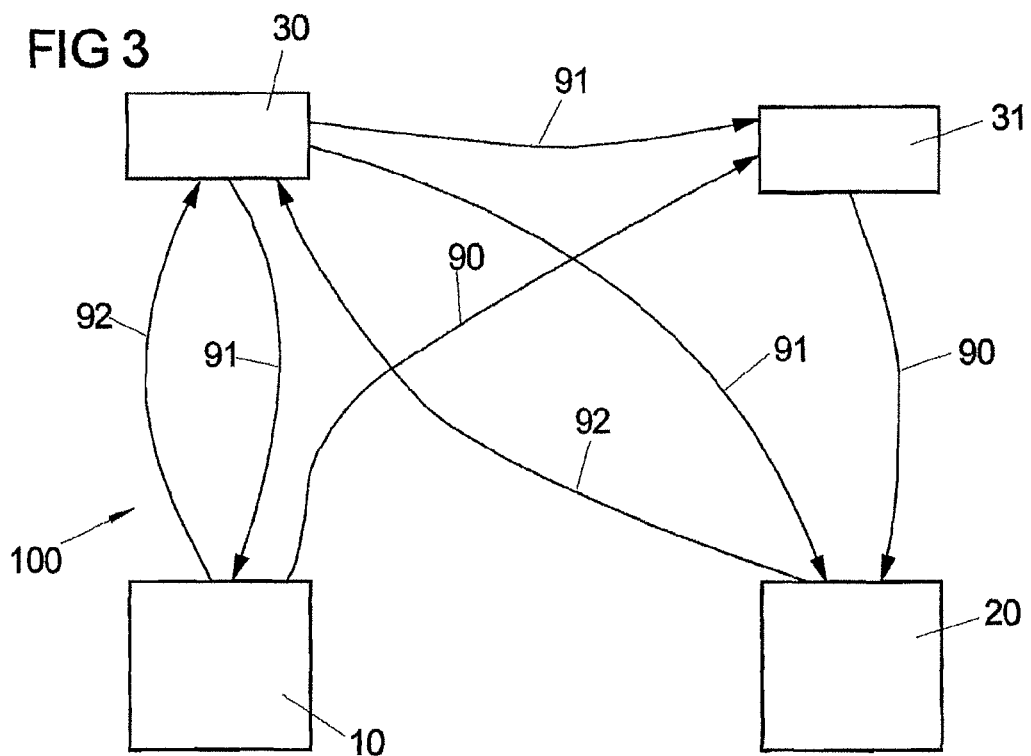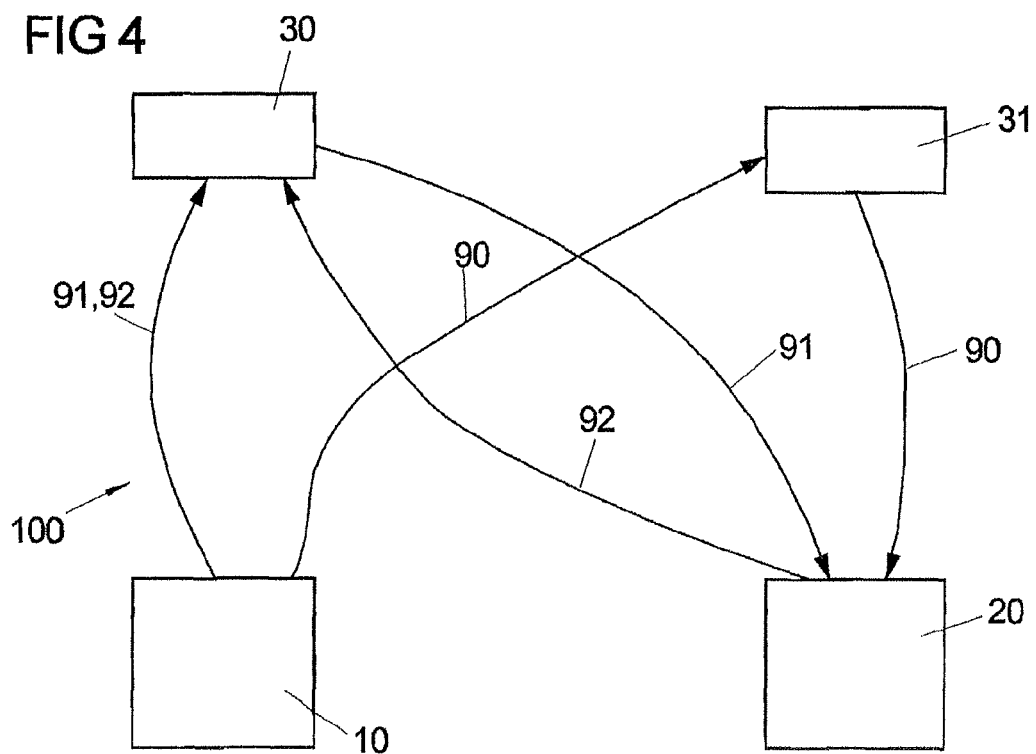

SYSTEM AND METHOD FOR TRANSMITTING DATA BETWEEN COMMUNICATION TERMINALS

BACKGROUND OF THE INVENTION

Field of the Invention

It is frequently desirable to transfer data, such as e.g. addresses, telephone numbers or any other data, spontaneously from one communication terminal of a user to a different communication terminal.

To do this, it has hitherto been necessary for the communication terminals either to exchange a communication address in advance, such as a telephone number or e-mail address, or, in the event of exchange via a local ad hoc connection via Bluetooth or infrared, one user selects the other from a list.

The object is therefore to simplify a fast data exchange.

SUMMARY OF THE INVENTION

The system has at least one first communication terminal and at least one second communication terminal, wherein at least one of the communication terminals is designed as a mobile device, in particular a hand-held device. The communication terminals are connectable via a data network to a switching unit. The system includes a means for calculating and/or evaluating the spatial distance of the communication terminals, and a means for determining and/or evaluating time intervals of communication inquiries to the switching unit in order to initiate a data transmission between the at least two communication terminals. A connecting means of the switching unit controls the data transmission depending on pre-determinable threshold values of the spatial distance of the at least two communication terminals and the time interval between the communication inquiries.

Location and time information therefore suffice to initiate and control a data transmission. The communication terminals and the switching unit represent independent devices respectively, which are set up and designed particularly for use in the system or the method.

BRIEF DESCRIPTION OF THE DRAWINGS

Example embodiments are described in connection with the following illustrations, in which:

FIG. 3 shows a third embodiment using a system and a method for data transmission, using a data exchange node;

FIG. 4 shows a fourth embodiment using a system and a method for data transmission, using a data exchange node;

DESCRIPTION OF THE PREFERRED EMBODIMENTS

Figure 1:
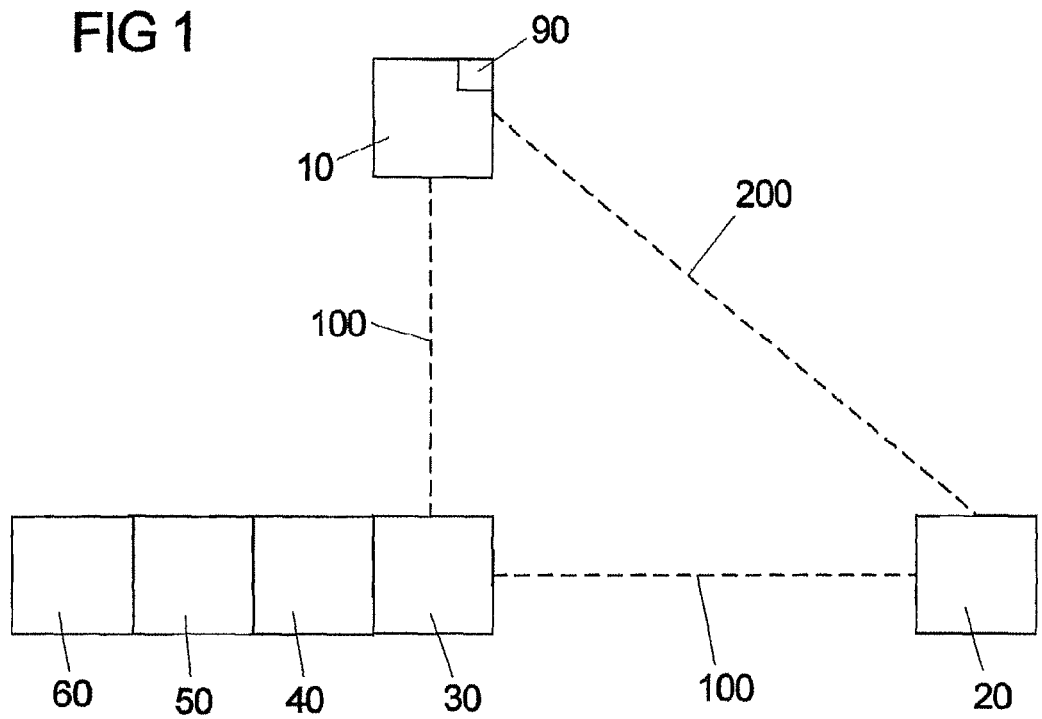
FIG. 1 shows a first embodiment using a system and a method for data transmission.

For the sake of simplicity, the description below is mainly based on two mobile communication terminals 10, 20, whereas more than two communication terminals 10, can basically also be used. It is also basically possible that one or more communication terminals 10, 20 are stationary.

With the embodiments, a faster and simpler data exchange is possible, which is carried out depending on the location of the communication terminals 10, 20 and depending on the temporal proximity of the communication inquiries 200 between the communication terminals 10, 20 with the aid of a data-processing switching unit 30 (also referred to as a switching node) accessible via a data network 100. The communication inquiry may have an inquiry data record 70.

The switching unit 30 is defined for the communication terminals 10, 20 in that all communication terminals 10, 20 wishing to participate in the data exchange recognize this switching station 30 as such and are able to communicate with the switching station 30.

An example usage scenario of a first embodiment will be explained in connection with FIG. 1.

Two people get to know each other at a conference and would like to exchange their contact data; both persons have a mobile communication terminal 10, 20 (data-processing and communication device, e.g. a so-called Smartphone or a portable computer), which has a communication interface to the Internet and a location-finding function which determines the location of the communication terminals 10, 20.

One option for location determination is a GPS system, with which the geographical coordinates are determinable; further methods for location definition will also be explained.

Both communication partners activate the provided communication function on the respective communication terminal 10, 20. The sending partner also selects information to be sent; a useful data record 90. The useful data record 90 may, for example, be a file or a URL. In FIG. 1, the useful data record 90 is stored on the communication terminal 10 of the sender. This does not necessarily have to be the case. As explained later, the useful data record 90 can also be stored on a different unit.

In the present example, the useful data record 90 would have the contact data of the sending partner (or at least a link to the useful data record 90).

The communication inquiry 200 can be activated and selected by pressing a key, by making a selection on a touch-screen, by means of an acoustic voice input and/or by means of a specific movement of one of the communication terminals 10, 20, which is recognized by acceleration sensors contained in the communication terminal 10, 20 as part of a gesture interpretation means 80. The gesture interpretation means 80 has a computer, which measures measured acceleration (linear accelerations, angular accelerations) and thereby recognizes a specific movement (gesture).

In particular, this enables a particularly fast and intuitive exchange of data. It is thus possible, for example, to program the communication terminals 10, 20 in such a way that a short slinging (or also pitching) movement of the communication terminal 10, 20 is detected by acceleration sensors and is understood as a transmission gesture. Analogously, a similar gesture could be programmed in the receiving communication terminal 10, 20. The acceleration sensors (or the gesture interpretation means 80) enable gestures to be distinguished.

The creation of a communication facility by means of gestures is, in particular, also possible between many communication terminals 10, 20. If, for example, a sender wishes to send a message to many communication terminals 10, 20, he performs the gesture for the communication inquiry 200, the potential receivers can carry out the provided gesture for a reception respectively, whereupon the sender initiates the data transmission, e.g. by means of a slinging gesture. Completely new and intuitive data transmissions can thus be carried out, without the data-exchanging persons having to exchange access data, addresses or telephone numbers.

In order to define the time of the interaction between the communication terminals 10, 20 even more precisely, an additional action to define this time can be implemented following the activation of the data transmission. Thus, for example, the communication terminals 10, 20 can be knocked against one another or a "throw gesture" can be carried out with the one communication terminal 10, 20, which must correspond to a "catch gesture" carried out by the other user with the communication terminal 10, 20.

The temporal proximity of the activation can be measured by reading out clocks contained within the device and/or synchronized via a data network 100 and/or by means of a clock located in the switching unit 30, which retains the times of the arrival of the switching inquiries of the communication partners.

Both methods for time measurement can be used, so that any errors in the measurement can be recognized and compensated for in the switching unit 30 by means of clocks contained within the device. Alternatively, the switching unit 30 may provide a dedicated service in order to determine and compensate for the deviation of the local clocks.

One option for compensating for the deviation of clocks in different communication terminals 10, 20 with a communication process consists in providing data packets with timestamps and measuring the transit time of the data packets in both directions.

The respective location of the communication units 10, can be determined, for example, in the following ways:

A relatively rough method of location finding is carried out by requesting, via the data network, the geographical coordinates of one or more mobile base stations, to which at least one communication terminal 10, 20 is currently connected.

A more precise location finding is possible if the at least one communication terminal 10, 20 is located in the vicinity of wireless WLAN base stations, the identifier of which can be received even if no communication takes place via these base stations. The WLAN BSS ID is appropriately used.

The identifiers of these WLAN base stations are transferred to a network service which knows the geographical positions of these base stations and determines the location of the inquiring communication terminal 10, 20 therefrom.

The determination of the geographical coordinates can also be dispensed with if both communication terminals 10, 20 transfer the identifiers (BSS-IDs) directly to the switching unit 30. In this case, the switching unit 30 can determine, by comparison of the BSS-Ids, whether both communication terminals are located within range of the same WLAN base station and therefore have the necessary spatial proximity. This information, together with the temporal proximity of the inquiries, suffices to communicate a data exchange.

An even more precise position determination is possible if the devices have a GPS location device and can receive the signal of a sufficient number of satellites, although this is often not possible in internal areas.

Additionally or alternatively, data from Bluetooth connections can also be evaluated in order to determine the spatial distance between at least two communication terminals 10, 20.

It is possible to combine two or three of the aforementioned location functions transparently with one another. They supply, for example, a longitude and latitude in conjunction with a radius, which indicates the accuracy of the position determination. This is described more precisely in connection with FIG. 5.

Therefore, after the communication function has been activated, both communication terminals 10, 20 transfer the results of their location determination and, if necessary, also the precise time of the activation to the switching unit 30.

For further restriction of the group of communication participants, additional data can also be transferred, for example a spontaneously agreed PIN code or information, the data relating to the type of movement carried out for the activation, which were detected by the acceleration sensors, and the spatial orientation of the terminals, which was determined by the acceleration sensors and/or a built-in compass, in particular a magnetic compass. Thus, for example, the performance of a switching can be restricted to the communication terminals 10, 20 which point to one another or to which are similarly strongly inclined, which can be achieved, for example, by laying the communication terminals 10, 20 on top of one another. In addition, the communication terminals 10, 20 can transfer one or more communication addresses (such as an IP address, e-mail address, etc.), at which the communication terminals 10, 20 can be contacted respectively. However, this is basically not necessary, since the communication can also take place completely anonymously via a data exchange service of the switching unit 30 or a data exchange device separated from it; alternative data exchange devices can also be selected by the sender, so that specific user groups can, for example, operate their own data exchange devices.

However, before the useful data record 90 is transferred, the switching unit 30 calculates an allocation of the communication partners from the spatial proximity of the transferred locations of the communication terminals 10, 20, if necessary from the accuracy of the location definition, from the temporal proximity and, if necessary, from the additional data. A communication between communication devices 10, 20 can thus be initiated in the simplest case, merely on the basis that the communication devices 10, 20 are spatially close to one another and send communication inquiries 200 temporally adjusted with one another.

The switching unit 30 therefore knows which communication terminals 10, 20 currently wish to communicate with whom. In the embodiment shown in FIG. 1, the switching unit 30 has a means 40 for evaluating the spatial distance between the communication terminals 10, 20, the function of which is explained in detail with reference to an example in connection with FIG. 5. Furthermore, the switching unit 30 has a means 50 for evaluating time intervals of communication inquiries 200.

Moreover, a connecting means 60, with which the data transmission is controlled depending on predefinable threshold values for the spatial distance and the time intervals, is allocated to the switching unit 30. The allocation or coupling of the switching unit 30 and the connecting means 60 also enables a logical and/or spatial separation of the units.

It is possible to allow the users of the communication terminals 10, 20 a certain control over the selectivity of these calculations, for example in that required threshold values for the spatial and temporal proximity can be transferred by the user. These threshold values can also be set automatically, e.g. also depending on the density of the communication terminals 10, 20.

The threshold values can be conform to the localization methods or transmission methods which are used.

If, for example, data are transmitted between communication devices 10, 20 within a mobile radio cell, the spatial distance between the communication terminals 10, 20 can be up to 20 km. In the case of a localization by means of WLAN networks, the spatial distance can be up to 200 m. In the case of a localization by means of GPS, the spatial distance can be up to 10 m.

If data are to be transmitted from a sender to many communication terminals 10, 20 in a large area (e.g. a stadium), the time interval can be up to 30 seconds. In the case of a spatially closer arrangement, the time interval can be up to 5 seconds. In the case of a direct contact of the communication terminals 10, 20, a time interval of up to 100 ms may suffice.

The switching unit 30 recognizes, for example, that two communication terminals 10, 20 wish to communicate with one another, if, within less than 100 ms, two communication terminals 10, 20, within a radius of 10 m, send a communication inquiry 200 to each other, and then to the switching unit 30. This spatial and temporal condition is sufficient for the system and method to say that a data exchange is to take place between these two communication terminals 10, 20. More information or conditions are not required. The spatial and temporal proximity and their evaluation suffice for the initiation and performance of the data exchange.

Nevertheless, in practice, in the case of an imprecise location definition of the communication terminals 10, in conjunction with a high usage frequency, "collisions" may occur in the allocation, for example at events such as congresses. Here also, the user can be allowed a certain control over the behavior of the switching unit. Thus, the user can, for example, determine whether only a point-to-point connection is permitted, or whether a plurality of recipients can simultaneously receive the transmitted message.

The behavior in the event of transmission collisions can be controlled accordingly. These settings can also be selected ad hoc by different activation gestures.

It is thus possible to initiate a one-to-one (see e.g. FIG. 1), a one-to-many or a many-to-many communication.

If, therefore, the switching unit 30 has now successfully carried out an allocation of communication terminals 10, 20 in accordance with the allocation rules, the actual data, i.e. the useful data record 90, can be transmitted.

Different transmission paths can be used, wherein the user can apply preferences or restrictions here also. If the user wishes, for example, to preserve his anonymity vis-à-vis the communication partner and only transfer a document, the useful data can be transmitted exclusively via the switching unit 30, which then receives the useful data, stores them temporarily and transfers them to the recipient(s). If, on the other hand, the users do not want the switching unit 30 to gain knowledge of the useful data, instead only the addresses of the recipient(s) are sent to the sender; the useful data are then transmitted directly from the sender to the recipient. However, the latter is not possible in all cases, for example if the sender and receiver are located in private networks which are not accessible from the outside. If, on the other hand, at least one of the participants has a public IP address, a direct data transfer can be initiated. The system can also be designed in such a way that it automatically determines the best transmission path.

For the acceptance of the system, it is also appropriate to signal the success or failure of the switching to the users in real time. This can preferably be done by means of different audible signals or vibrations of the communication terminal 10, 20. Three types of signal can essentially be distinguished:

1) Successful switching
2) Failed switching
2a) No partner found
2b) Too many partners found/collision
3) Successful transfer
3a) Successfully transmitted
3b) Successfully received In order to reduce the latency in the case of transfer via the switching unit 30, the transmission can be started immediately following the selection of the data to be transmitted, without waiting for the activation input.

Figure 2:
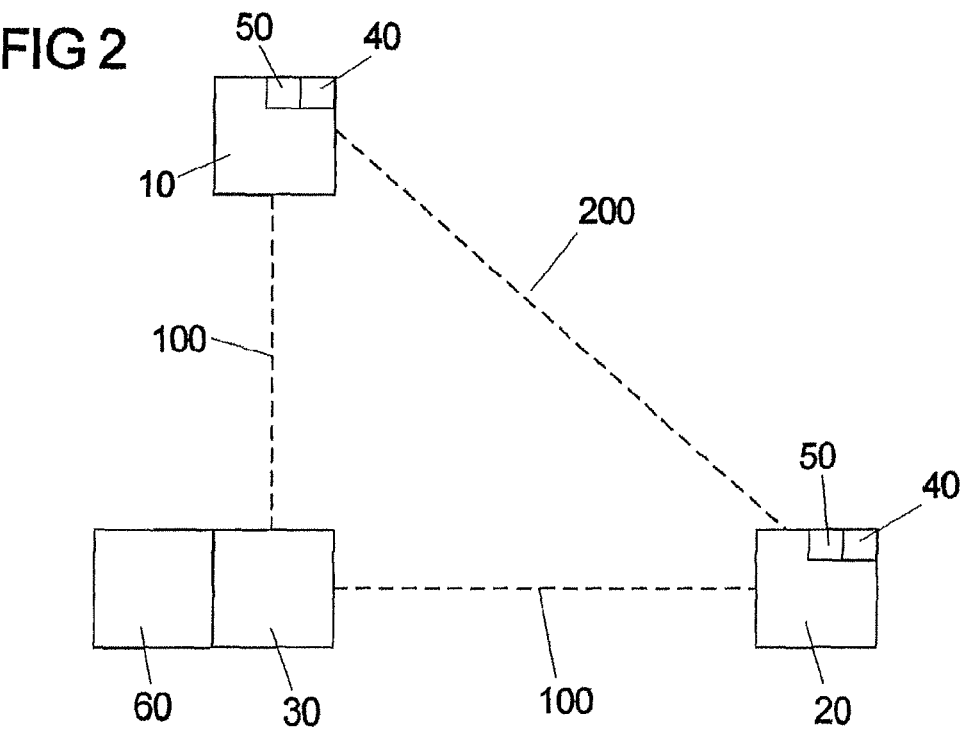
FIG. 2 shows a second embodiment using a system and a method for data transmission.

A variation of the embodiment according to FIG. 1 is shown in FIG. 2, so that reference can basically be made to the description of FIG. 1.

The embodiment shown in FIG. 2 differs from the embodiment according to FIG. 1 in that the means 40 for evaluating the spatial distance and the means 50 for evaluating time intervals are not centrally coupled to the switching unit 30, but are disposed locally on the communication terminals 10, 20.

In every case, these means 40, 50, and also the switching unit 30 and the connecting means 60 itself are implemented as software and/or hardware. Conventional computers and/or processors can be used for this purpose.

It should also be mentioned that it is also possible for at least one of the communication terminals 10, 20 to be designed as stationary.

For example, a central, stationary memory, to which a mobile communication terminal, 10, 20 can transmit data, can be set up at a public location. A user can thus initiate the transmission of a useful data record 90 to this stationary memory with a gesture when passing.

A different user passes this stationary memory and can then retrieve the useful data record 90 from this memory within the temporal and spatial conditions, without the access data of the transmitting communication terminal 10 having to be known to him. This stationary buffer memory thus fulfils the role of a communication terminal in that data are exchanged with mobile data communication terminals 10, 20.

Embodiments are described in FIGS. 3 and 4, in which the useful data record 90 is transmitted by means of a data exchange node 31 via the data network 100. For this purpose, a useful data record 90 had previously been transmitted to the data exchange node 31. The switching unit 30, which is coupled via a data connection to the data exchange node 31, transmits the useful data address 91 to the sender, i.e. a communication terminal 10.

As in the previously described embodiments (FIG. 1, 2), the start of the actual data exchange is a communication inquiry 200 between two communication terminals 10, 20. As a result of this, the switching unit 30 determines the information 92 relating to the location and the time of the communication inquiry 200 using the means 40 for evaluating the spatial distance and the means 50 for evaluating time intervals.

The switching unit 30 checks whether the spatial and temporal conditions (threshold values) for a data transmission are fulfilled. Depending thereon, the useful data address 91 is transferred to the recipient, i.e. the second communication terminal 20. The useful data record 90 can then be downloaded from the data exchange node 31 with this useful data address 91.

By the intermediate connection of a data exchange node 31, an even more extensive separation and/or decoupling of the data transmission is realized.

A variation of the embodiment according to FIG. 3 is shown in FIG. 4, so that reference can be made to the description of FIG. 3.

In contrast to the embodiment according to FIG. 3, the information relating to the location and time and the useful data address 91 of the useful data record 90 are exchanged in the embodiment according to FIG. 4 between the transmitting first communication terminal 10 and the switching unit 30, i.e. the sender selects the address of the useful data record 90.

The useful data record 90 is then transmitted to the second communication terminal 20 of the recipient as described in connection with FIG. 3.

Furthermore, it is possible in advance to store a copy of all content located on the communication terminal 10, 20 in the data exchange node 31, so that the transmission of the actual useful data records 90 from the transmitting communication terminal 10, 20 to the data exchange device can be dispensed with and said records can be directly retrieved there by recipients.

Once the transfer has taken place, both the data relating to the switching which has taken place and, above all, the temporarily stored data on the switching unit 30 are deleted. However, it is also possible that a sender chooses a longer period and can thereby store data at a specific geographical location for a longer period.

However, for a "data storage" of this type, the system must take special precautions, so that a storage of this type does not result in unnecessary collisions with short-term data exchange in the area. Thus, the system can either carry out a special treatment for data of this type, or undertake a general prioritization of the data, wherein data with a long storage period are given a lower priority.

Furthermore, it is appropriate if the switching unit 30 receives additional measures to protect against misuse. On the one hand, the switching unit 30 can work with a user authentication, in which the users must carry out a one-off prior registration and users perpetrating misuse can be excluded.

Furthermore, it is appropriate in practice to limit the number of communication inquiries 200 of a user to a conventional extent in order to avoid denial of service attacks and man-in-the-middle attacks by users, who can otherwise use manipulated programs to send large numbers of switching inquiries to the system which do not correspond to their actual location.

As a further measure to impede the unauthorized dispatch of communication inquiries 200, the communication inquiry 200 can be digitally signed.

Along with the one-to-one transmission, information can also be sent in a targeted manner to a locally present group. Thus, for example, a presenter can throw information into the presentation room to be caught by visitors.

Furthermore, a group of persons can exchange addresses with one another at a meeting in that all persons present simultaneously activate a transmit and receive function.

Figure 5:
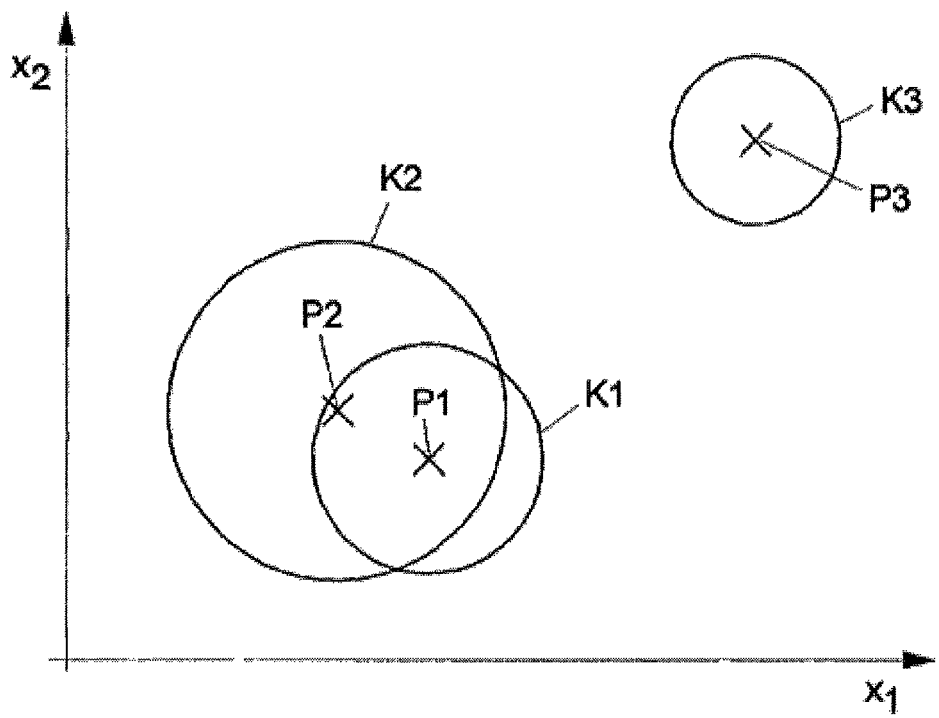
FIG. 5 shows a representation of the spatial distance between three communication terminals.

FIG. 5 shows an embodiment for an evaluation of the spatial distance between two communication terminals 10, 20.

Local coordinates $X_1$, $X_2$ are defined in a region, i.e. a defined spatial area. Let it be assumed that the coordinate of the first communication terminal 10 is P1, the coordinate of the second communication terminal 20 is P2. A third communication terminal has the coordinates P3.

If communication inquiries 200 are then sent from the communication terminals 10, 20, the switching unit 30 (not shown here) recognizes the locations of the three communication terminals 10, 20. The switching unit 30 in each case allocates a tolerance range K1, K2, K3 to the locations P1, P2, P3. The radii of the circular tolerance ranges K1, K2, K3 depend on the accuracy of the determination method for the location. The circular tolerance ranges K1, K2, K3 shown here are only examples, since spatial structures, such as e.g. spheres, are also usable.

The determination of a location with a GPS method is, for example, normally more accurate than the determination with a radio cell method. By means of the tolerance ranges K1, K2, K3, a probability range is defined in which the communication terminals 10, 20 are located.

The means 40 for evaluating the spatial data recognizes that the tolerance ranges K1, K2 overlap, so that the interval between P1 and P2 has fallen below a predefined threshold. A necessary condition for the performance of a data exchange between the communication terminals 10, 20 is thus fulfilled. If the third communication terminal at P3 were similarly to carry out a communication inquiry 200 at the same time, no data transmission would take place, since the spatial condition for a data transmission is not fulfilled.

Thus, the connecting means 60 (not shown here) coupled to the switching unit 30 can determine the location of the at least one communication terminal 10, 20 as an area or as a spatial volume and can establish the spatial distance through inclusion of a location or inclusion or overlapping of the areas or spaces.

For the sake of clarity, the results of the location determination of three communication terminals 10, 20 are shown in FIG. 5. From the determined coordinates P1, P2 and P3 in conjunction with the associated accuracy ranges K1, K2 and K3, it is evident that only the communication terminals 10, 20 at the positions P1, P2 are to be coupled with one another, and a further communication terminal at the position P3 with the accuracy range K3 is not to be considered for a data exchange. To the person skilled in the art, it is clear that the described conditions for three communication terminals 10, 20 can be directly transferred to more devices. It is also clear that these conditions apply to the different communication modes one-to-one communication, one-to-many, many-to-many and many-to-one.

Figure 6:
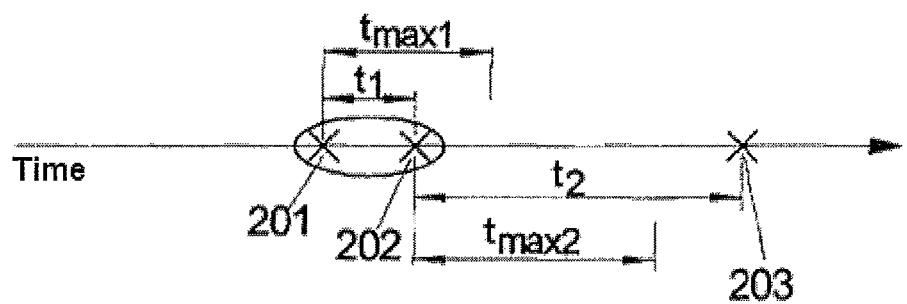
FIG. 6 shows a representation of a time interval between two communication inquiries.

FIG. 6 shows schematically a further condition for the start and performance of the data exchange, i.e. the function of the means 50 for the evaluation of the time interval (time window) between communication inquiries.

Three communication inquiries 201, 202, 203 are symbolized here by crosses on a timeline. In the first case, the first two communication inquiries 201, 202 take place within a relatively short interval $t_1$. The threshold value $t_{max1}$ is longer here, so that the switching unit 30 recognizes that two communication inquiries 201, 202 have been made here within a specific time, so that a necessary condition for the triggering of the data transmission is fulfilled.

At a later time, i.e. $t_2$ after $t_1$, the switching unit 30 registers a third communication inquiry 203. However, this is clearly outside the threshold value $t_{max2}$, where, in the selected example, $t_{max2}$ is greater than $t_{max1}$. As the threshold value is exceeded, the necessary condition for the data transmission is not fulfilled.

Figure 7:
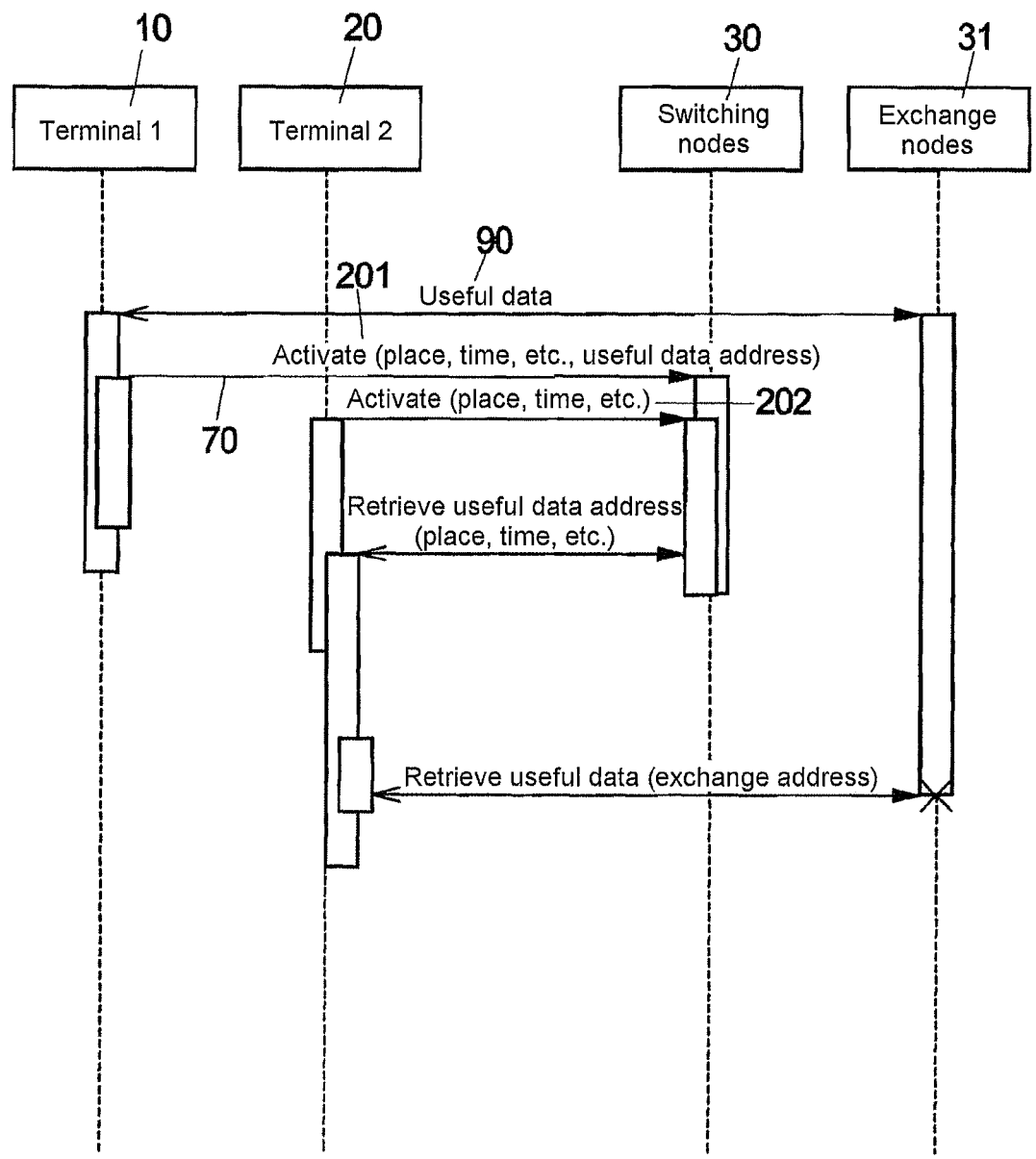
FIG. 7 shows a UML representation of the data exchange according to the embodiments shown in FIG. 3, 4.

FIG. 7 shows a UML representation of the data exchange in an example of a design form in which a data exchange node 31 is used.

In this embodiment, a useful data record 91 is first transmitted from the first communication terminal 10 to the data exchange node 31.

At a later time, the first communication terminal 10 sends a first communication inquiry 201 to the switching unit 30. The location, time and address of the useful data record 90 are determined and transmitted. An inquiry data record 70, which allows a unique identification, e.g. an agreed ID, is also shown here as an alternative.

A second communication inquiry 202 is then transferred from the second communication terminal 20 to the switching unit 30, indicating that the second communication terminal 20 is being made ready to receive. The location and time are determined and transmitted here also.

The interval of the two communication inquiries 201, 202 occurs within a temporal threshold value $T_{max}$ (i.e. within a predetermined time window) and a spatial threshold value (i.e. within a predefined spatial distance). The numerical values for the threshold values depend in particular on the data transmission type and the data transmission mode (e.g. one-to-one, one-to-many, etc.).

The connecting means 60 (not shown here) of the switching unit 30 registers, with a means 40 (not shown separately here) for evaluating the spatial distance of the communication terminals 10, 20 and a means 50 (similarly not shown here) for evaluating the time intervals of the communication inquiries 201, 202, that the necessary conditions for the data exchange are fulfilled. The useful data record 90 can thus be transmitted from the data exchange node 31 to the second communication terminal 20.

Figure 8:
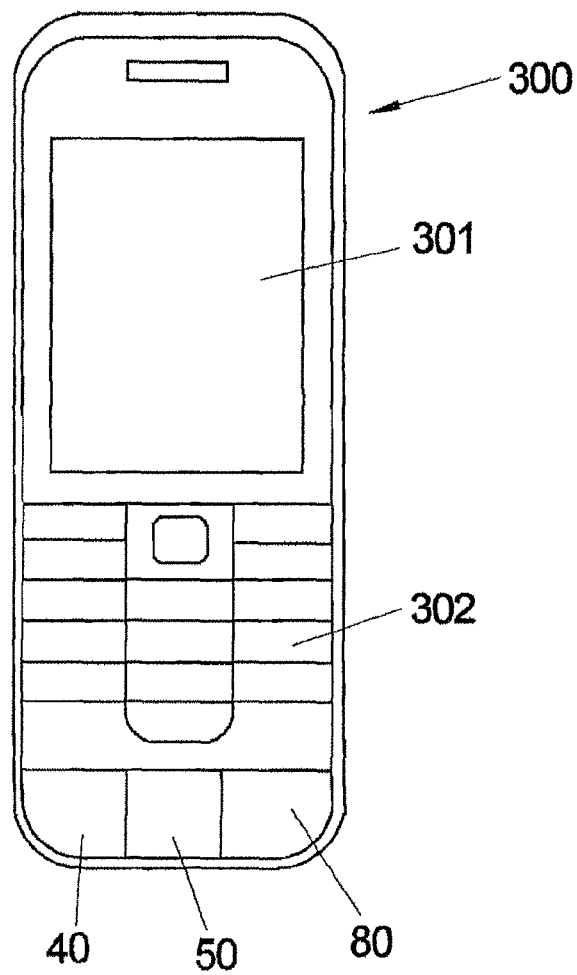
FIG. 8 shows a schematic representation of an embodiment of a communication terminal.

FIG. 8 shows schematically a communication terminal 300, which essentially has the functions of a Smartphone. In particular, it can transmit data to the Internet and receive data from the Internet. The communication terminal 300 has a display screen 301 and a keyboard 302 for entering data.

Figure 9A:
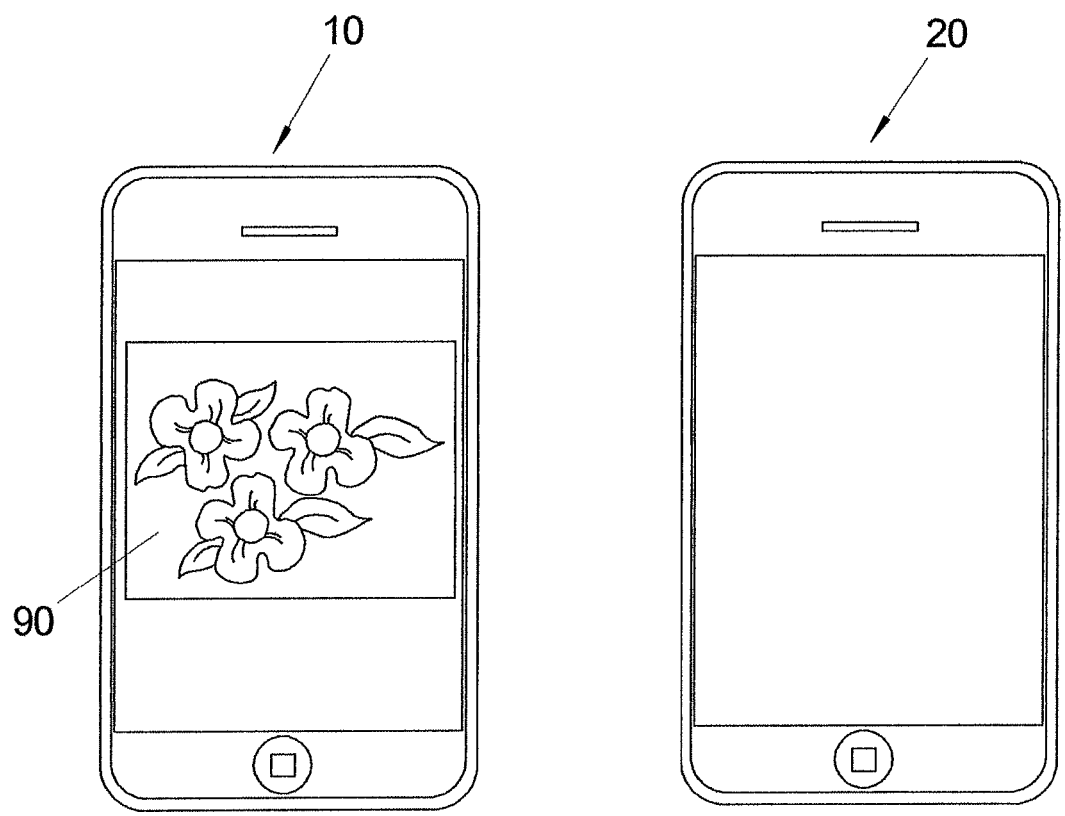
FIG. 9. A, B show a schematic representation of a use for data transmission between two communication terminals.
Figure 9B:
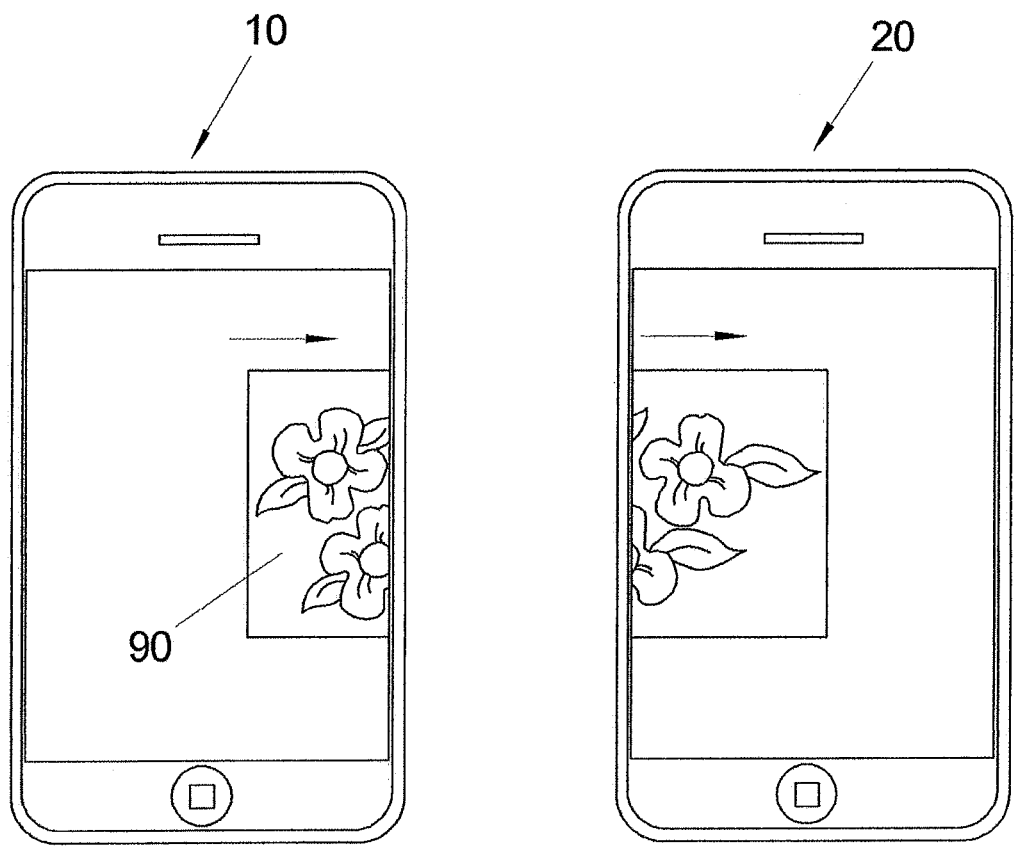

The communication terminal 300 is designed and set up in such a way that it is usable in the system and method, the various design forms of which have been described above. Thus, the communication terminal 300 is equipped with a means 40 for evaluating the spatial distance to a different communication terminal 10, 20 and a means 50 for evaluating time intervals of communication inquiries 200 to a switching unit 30 (not shown here). A communication inquiry 200 can, for example, be triggered by a key press. However, additionally or alternatively, a triggering can be effected through gestures, i.e. specific movement patterns. For this purpose, movement sensors 80 in or on the data communication terminal 300 serve to detect the movement of the data communication terminal 300 in the space. A throw-like movement can, for example, be instantly recognized as a communication inquiry 200. FIG. 9A, 9B show a data transmission between two communication terminals 10, 20 which are disposed parallel to one another.

The communication terminals 10, 20 are Smartphones, i.e. devices which, apart from the usual characteristics of a mobile telephone, also have the facilities to display and/or process files, such as e.g. image or text files. The communication terminals 10, 20 are equipped with a touchscreen. Advantageously, a one-to-one data transmission takes place between the communication terminals 10, 20.

With the facilities described above, it has been determined that the spatial distance between the communication terminals 10, 20 has fallen below a specific threshold value, so that the essential facility of the data transmission between the two communication terminals 10, 20 has been automatically established.

FIG. 9A shows the starting situation. A file (e.g. an image) is shown as a useful data record 90 on the display screen of the first communication terminal 10. The display screen of the second communication terminal 20 is blank.

FIG. 9B shows the communication process. If the user of the first communication terminal 10 displaces the useful data record in the direction of one of the edges of the display screen of the communication terminal 10, this is automatically understood as a communication request 200, 201, 202, 203 by the transmitting communication terminal 10. A one-to-one data transmission is initiated by the movement.

The receiving second communication terminal 20 recognizes the communication request 200, 201, 202, 203 and receives the image which is transmitted by the first communication terminal 10. The transmit process is symbolized by a pushing beyond the edge of the display screen of the first communication terminal 10. The receive process in the second communication terminal 20 is shown as a pushing out from the display screen edge. The presentation is selected here in such a way that the part of the image 90 pushed beyond the edge in the first communication terminal 10 appears on the display screen of the second communication terminal 20. The overall impression is created that the image, i.e. the useful data record 90, is displaced from one display screen onto another display screen.

REFERENCE NUMBERS

10 First Communication Terminal
20 Second Communication Terminal
30 Switching Unit
31 Data Exchange Node
40 Means for Evaluating the Spatial Distance
50 Means for Evaluating Time intervals
60 Connecting Means
70 Inquiry Data Record
80 Gesture Interpretation Means
90 Useful Data Record
91 Useful Data Address
92 Location and Time Information
100 Data Network
200 Communication Inquiry
201 First Communication Inquiry
202 Second Communication Inquiry
203 Third Communication Inquiry
300 Communication Terminal
301 Display Screen
302 Keyboard

The invention claimed is:

1. A system for transmitting data between at least two communication terminals comprising:
   a) at least one first communication terminal and at least one second communication terminal, wherein at least one communication terminal of the at least one first communication terminal and the at least one second communication terminal comprises at least one mobile device
   b) a switching unit connectable via a data network to each of the at least one first communication terminal and the at least one second communication terminal, wherein the switching unit is configured to handle useful data address data,
   c) a data exchange node connectable via the data network to each of the at least one first communication terminal and the at least one second communication terminal, wherein the data exchange node is at least logically separated from the switching unit, and wherein the data exchange node is configured to handle useful data records, and
   d) at least one non-transitory computer-readable storage medium in communication with at least one processor and having instructions stored thereon which, when executed by the at least one processor, cause the at least one processor to perform operations comprising:

at least one of calculating and evaluating a spatial distance of the at least one first communication and the at least one second communication terminal, at least one of determining and evaluating at least one time interval of communication inquiries to the switching unit in order to initiate a data transmission between the at least two communication terminals, and controlling the data transmission depending on predeterminable threshold values of the spatial distance of the at least two communication terminals and the at least one time interval between the communication inquiries.

2. The system as claimed in claim 1, wherein the at least one processor performs operations comprising:

determining a location of the at least one communication terminal of the at least one first communication terminal and the at least one second communication terminal as an area or spatial volume, and wherein the spatial distance is determined by inclusion of the location or inclusion or overlapping of the areas or spaces.

3. The system as claimed in claim 1, wherein a time of signaling of a communication inquiry is measured by a clock in the at least one communication terminal of the at least one first communication terminal and the at least one second communication terminal, and wherein a deviation of the clock in the at least one communication terminal of the at least one first communication terminal and the at least one second communication terminal from a clock in the at least one other communication terminal of the at least one of the at least one first communication terminal and the at least one second communication terminal is compensated by a communication process.

4. The system as claimed in claim 3, wherein the at least one processor performs operations comprising:

measuring the time of the signaling of the communication inquiry based at least partly on a time of arrival of the useful data records in the data exchange node.

5. The system as claimed in claim 3, wherein the at least one communication terminal of the at least one first communication terminal and the at least one second communication terminal is configured to enable triggering of the communication inquiry in response to at least one of actuation of at least one key on the at least one communication terminal, a movement of the at least one communication terminal in the space, an audible signal of the at least one communication terminal, a voice input of the at least one communication terminal, and touching of a touch-sensitive display screen of the at least one communication terminal, and wherein the at least one communication terminal is configured to store a corresponding coding in at least one of the communication inquiry and the inquiry data record.

6. The system as claimed in claim 3, wherein the at least one processor performs operations comprising:

selecting a useful data record to be transmitted before the signaling of the communication inquiry.

7. The system as claimed in claim 6, wherein the useful data record is automatically selected from a predefined quantity of useful data records based at least partly on specific characteristics of the signaling of the communication inquiry, and wherein the specific characteristics comprise at least the coding of the inquiry data record.

8. The system as claimed in claim 1, wherein the at least one communication terminal of the at least one first communication terminal and the at least one second communication terminal is configured to transfer an inquiry data record uniquely identifying communication partners to the switching unit.

9. The system as claimed in claim 1, wherein a multidirectional connection is set up between more than two communication terminals and configured for the subsequent transmission and reception of a plurality of useful data records between the more than two communication terminals.

10. The system as claimed in claim 1, wherein, due to a signaling of a communication inquiry by the switching unit, connections are restrictable to a single communication terminal as a transmitter and a single communication terminal as a receiver, and wherein, in the event of a plurality of transmitters or receivers being eligible on the basis of spatial and temporal proximity, switching is prevented by the switching unit.

11. The system as claimed in claim 1, wherein switching is restricted to a single receiver by signaling by a user, and wherein, in the event of a plurality of receivers being spatially and temporally eligible, the switching is prevented by the switching unit.

12. The system as claimed in claim 1, wherein switching is restricted by signaling by a user to a single transmitter, and wherein, in the event of a plurality of transmitters being spatially and temporally eligible, the switching is prevented by the switching unit.

13. The system as claimed in claim 1, wherein at least one useful data record is exchanged exclusively between the at least two communication terminals and the exchange is signaled to the switching unit by a physical knocking together of the at least two communication terminals.

14. The system as claimed in claim 13, wherein the knocking together of the at least two communication terminals is registered by at least one of acceleration sensors, distance sensors, and microphones of the at least two communication terminals.

15. The system as claimed in claim 1, further including a gesture interpretation configured to evaluate a movement of the at least one communication terminal of the at least one first communication terminal and the at least one second communication terminal.

16. The system as claimed in claim 15, wherein a movement of a transmitting communication terminal is interpretable as a throw or transmit gesture.

17. The system as claimed in claim 15, wherein a movement of a receiving communication terminal is interpretable as a receive or catch gesture.

18. The system as claimed in claim 1, wherein the at least one of calculating and evaluating the spatial distance of the at least two communication terminals evaluates at least one of data of at least one WLAN network, data of at least one mobile network, data of a Bluetooth network, and data of at least one GPS system.

19. The system as claimed in claim 1, wherein, due to movement of an object on a display screen of the at least one first communication terminal, a data connection to the at least one second communication terminal is set up such that the object is movable from the display screen of the first communication terminal onto a display screen of the second communication terminal.

20. A method for transmitting data between at least two communication terminals comprising at least one first communication terminal and at least one second communication terminal, wherein at least one communication terminal of the at least one first communication terminal and the at least one second communication terminal comprises a mobile device, wherein data are exchangeable via a data network between the at least one first communication terminal and the at least one second communication terminal and a switching unit connectable thereto, the method comprising:

a) at least one of calculating and evaluating a spatial distance between the at least two communication terminals,
b) at least one of determining and evaluating time intervals of communication inquiries made to the switching unit,
c) initiating a data transmission between the at least two communication terminals based at least partly on the spatial distance and the time intervals, wherein the data transmission is controlled based at least partly on predetermined threshold values of the spatial distance of the at least two communication terminals and the time intervals of the communication inquiries,
d) handling, by a switching unit connected via the data network to each of the at least two communication terminals, useful data address data, and
e) handling, by a data exchange node connected via the data network to each of the at least two communications terminals, useful data records, wherein the data exchange node is at least logically separated from the switching unit.

* * * * *